April 19, 1960     J. L. BENSON ET AL     2,933,327
FRONT WHEEL MOUNTING FOR TRACTORS AND THE LIKE
Filed July 25, 1958
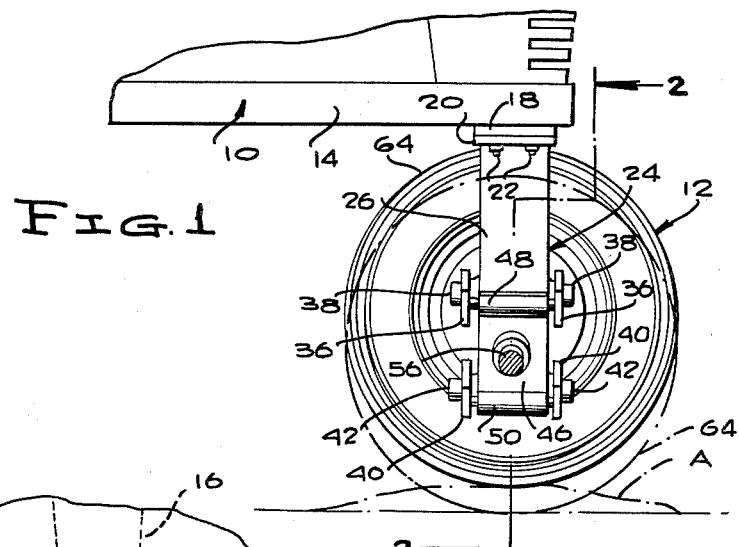
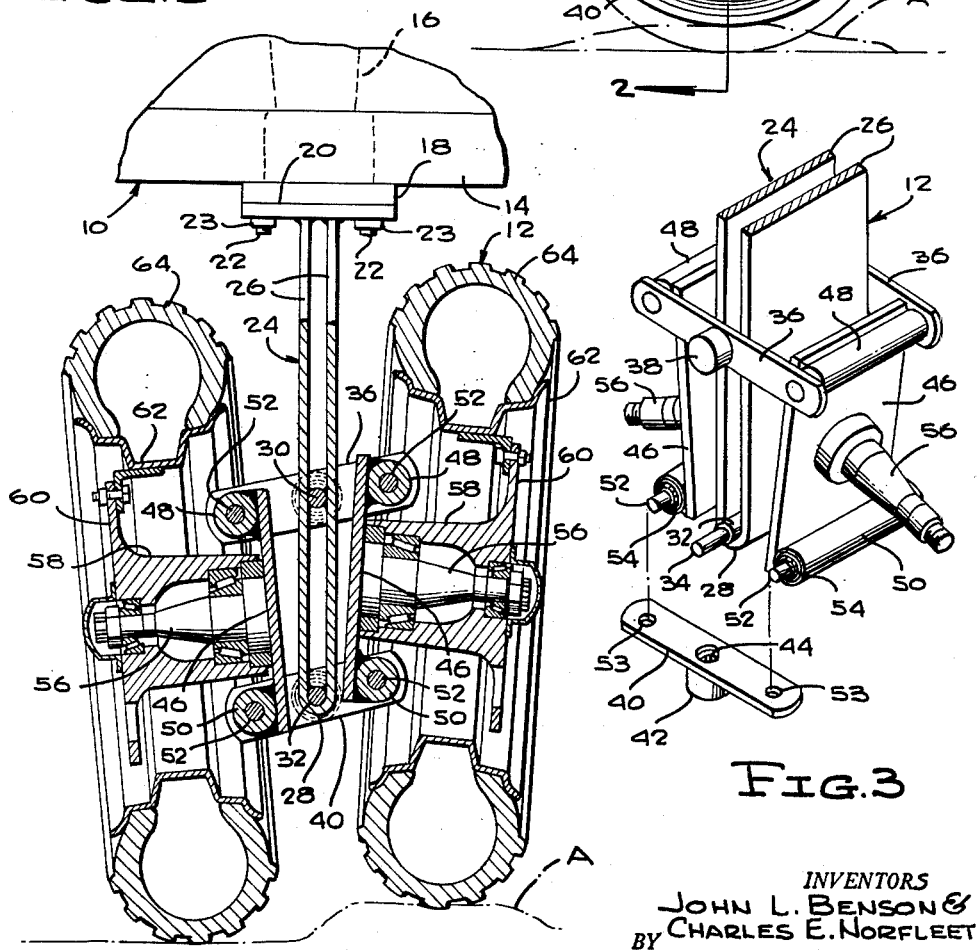
INVENTORS
JOHN L. BENSON &
BY CHARLES E. NORFLEET
McMorrow, Berman & Davidson
ATTORNEYS — # United States Patent Office 2,933,327
Patented Apr. 19, 1960

2,933,327

FRONT WHEEL MOUNTING FOR TRACTORS AND THE LIKE

John L. Benson and Charles E. Norfleet, Hale Center, Tex.

Application July 25, 1958, Serial No. 750,941

1 Claim. (Cl. 280—87)

This invention relates generally to wheel mounts. More particularly, the invention has reference to a front wheel mounting for tractors and like farm implements.

Conventionally, a tractor includes a steerable front wheel assembly, comprising transversely spaced wheels, disposed at opposite sides of and connected to a steering column or equivalent means, so as to have conjoint turning movement about the axis of the steering post, during the maneuvering of the tractor or other farm implement.

Initially, tractors were constructed with a pair of closely spaced front wheels, mounted in closely spaced, transverse alignment upon a steering post or shaft on rigid, laterally extended spindles carried by said post. By reason of this arrangement, when either wheel met with a rise in ground, such as a partially buried stone, said wheel would tend to elevate the other wheel above the ground. As a result, the entire weight of the front end of the tractor would be carried by one wheel, resulting in a serious, uneven transverse stress upon the steering assembly.

To overcome this deficiency in front wheel assembly construction, it has been proposed to provide a pair of front wheels so connected to the steering post that is disposed therebetween as to permit one wheel to be elevated above the other, when said one wheel meets an obstruction. In this way, it has been proposed to maintain both wheels in contact with the ground surface, despite the relative vertical spacing of the wheels.

Overcoming the initial problem, however, has tended to create other problems. Among these is the difficulty wherein the elevated front wheel tends to strike adjacent components of the frame or other structure of the tractor disposed immediately above and adjacent to the elevated wheel. Clearance at this location upon a tractor, it should be noted, is at a minimum and the free upward movement of the wheel, substantially in a straight vertical path, has involved the striking, in many instances, of the adjacent portion of the vehicle frame.

In addition, it has been found that the rising and falling of the wheels without deviation from the substantially vertical planes in which the wheels are disposed when in their normal, transversely aligned positions upon level ground, tends to create an uneven distribution of transverse stress, producing to some extent the problems that were initially noted in front wheel mountings, as previously indicated herein.

The present invention has, as one important object, the overcoming of the problems which have been noted, particularly in constructions wherein one wheel has the adaptability of being elevated relative to the other wheel when encountering an obstruction. To this end, the invention, summarized briefly, includes wheels which are cambered, that is, the wheels are in downwardly convergent planes, thus to locate the lowermost portions of the wheels in closely spaced relation, at a distance apart substantially smaller than the distance measured transversely between the uppermost portions of the wheels. In accordance with the present invention, the downwardly convergent wheels are disposed at opposite sides of a plate-like standard, to which are connected upper and lower pairs of cross-members. The upper cross-members are of greater length than the lower cross-members, and carried by the respective cross-members are connecting pins, passing through sleeves carried by downwardly convergent wheel-support plates. Rigid with and projecting laterally outwardly from the respective wheel-support plates are spindles, on which the wheels are rotatably mounted. Said spindles extend normally to the planes of the downwardly convergent plates, thus imparting the cambered arrangement to the wheels.

By reason of this arrangement, when one wheel is elevated relative to the other wheel, the wheel moves into a progressively greater angle of inclination relative to the vertical, so that the topmost portion of the wheel moves in a direction having a definite horizontal component as well as the vertical component hereinbefore noted. In this way, maximum tendency of the topmost portion of the wheel to clear adjacent, overhead portions of the tractor is created, as distinguished from the prior art construction discussed in a general manner above.

Another important object of the present invention is to provide for relative vertical movement of the transversely spaced, steerable front wheels, while maintaining the lowermost portions of the wheels at a minimum transverse distance from each other. This is of importance, in tractors of the type described, since said tractors are most usually employed in row crop farming operations, wherein the front wheel must move between adjacent rows, which rows in some instances are spaced apart only a very short distance. By reason of the invention, a minimum transverse spacing of the wheels is provided, while still providing for the relative vertical adjustment of the wheels as obstructions are met and passed. This is distinguished from prior art constructions, wherein relative vertical adjustment of the wheels has been achieved, usually, only at the cost of transversely spacing the wheels apart a distance greater than is desired for maximum efficiency of operation.

Another important object is to provide, in a cambered front wheel assembly, a construction wherein the transverse spacing of the lowermost portions of the wheels is in fact decreased, in practical operation of the device, as one wheel is elevated relative to the other, in the sense of the distance of the lowermost portions of the wheels from the vertical axis defined by the steering post located between the wheels. In other words, as a wheel moves upwardly in a manner such that its plane goes into a greater angle to the vertical than when the wheel is in its normal, lowered position, the lowermost portion of the wheel moves not only vertically, but in a direction having a horizontal component toward the steering post, while the topmost portion of the wheel also moves vertically as well as in a direction having a horizontal component toward the steering post. However, both the vertical and horizontal distances traversed by the topmost portion are respectively less than the vertical and horizontal distances traversed by the lowermost portion.

Another object is to provide a particular arrangement, incorporating cross members of different lengths and downwardly convergent wheel-support plates, such that the hinge axes defined where said wheel-support plates are connected to the cross members are at a maximum distance laterally outwardly from the vertical axis defined by the steering post, notwithstanding the fact that the wheels themselves are located a minimum distance laterally outwardly from said vertical axis.

Yet another object is to provide a generally improved steerable front wheel mounting for tractors and like implements, designed to be rugged, substantially trouble-free in operation, capable of manufacture at relatively low cost, and designed to be incorporated in otherwise generally conventional tractor construction with a minimum amount of expense.

Other objects will appear from the following description, the claim appended thereto, and from the annexed drawing, in which like reference characters designate like parts throughout the several views, and wherein:

Figure 1 is a side elevational view of the steerable front wheel assembly of a tractor, the tractor being illustrated fragmentarily, said assembly being illustrated with one wheel in raised and lowered positions in full and dotted lines respectively.

Figure 2 is an enlarged transverse, vertical sectional view, taken substantially on line 2—2 of Figure 1, with one wheel elevated relative to the other wheel; and Figure 3 is a fragmentary, partially exploded perspective view of the front wheel assembly, on a scale enlarged above that of Figure 1, with the wheels removed.

Referring to the drawing in detail, generally designated at 10 is a tractor. At 12 there has been generally designated the steerable front wheel assembly of a tractor, said assembly comprising the present invention.

The tractor includes the usual main frame 14, and at 16 (see Figure 2) there has been designated a vertically disposed steering column, journaled in the front end of the tractor in a vertical position. The steering column 16 at its lower end includes a horizontally disposed bottom plate 18.

The steerable front wheel assembly 12 comprising the present invention includes, at its upper end, a horizontally disposed connecting plate 20 which is in face-contacting relation to the plate 18. The plate 20, in the illustrated embodiment, is of rectangular configuration, although the configuration of the plate 20 could obviously be varied according to the desires of the particular manufacturer. The plate 20 is provided with openings, receiving depending studs or bolts 22 carried by the plate 18. Nuts 23 are threaded upon the bolts, thus to provide a fixed connection of plate 20 to plate 18, whereby on rotation of the steering post 16 the plate 20 will be turned about a vertical axis.

Rigid with and extending downwardly from the plate 20 is a vertically disposed standard generally designated 24. In accordance with the invention, this comprises closely spaced, wide, flat plates 26 elongated in a vertical direction as shown in Figure 1, said plates being welded or otherwise fixedly secured at their upper ends to the plate 20.

At their lower ends, the plates 26 are integrally connected by a bight portion 28, which is transversely curved as shown in Figure 2 through substantially 180 degrees.

In accordance with the present invention, an upper bearing pin 30 and a lower bearing pin 32 are disposed between the plates 26, said pins being welded to the respective plates. The pins extend horizontally in a fore and aft direction, and pin 32 (see Figure 3) has reduced, axial extensions 34 at its opposite ends. The pin 30 would be similarly formed with said reduced, axial extensions.

In accordance with the present invention, there is provided an upper pair of cross members 36 and a lower pair of cross members 40. The upper pair of cross memebrs 36 comprises opposite but identical members disposed crosswise of and in contact with the front and rear vertical edges of the respective plates, a substantial distance above the lower extremities of said plates. Said upper members 36 are formed, medially between their ends, with outwardly projecting, inwardly opening, confronting bearing retainer cups 38.

The lower cross members 40 are also oppositely but identically formed, and have outwardly projecting, inwardly opening retainer cups 42. In the several retainer cups 38, 42 there are mounted roller bearings 44, although it will be understood that any other suitable type of bearings can be used for the purpose of reducing friction to a minimum.

Disposed at opposite sides of the standard 24 are downwardly convergent, flat, rectangular wheel-support plates 46. These are oppositely but identically formed, and as will be noted from Figure 2, welded to the outer faces of the respective plates 46 are upper bearing or hinge sleeves 48 and lower hinge sleeves 50. The hinge sleeves extend in parallel relation to the stationary bearing pins 30, 32. It is an important feature of the invention, in this connection, that the sleeves 48 are disposed against the outer surfaces of the plates 46, that is, at the sides of the plates 46 remote from the centrally disposed standard. By reason of this arrangement, as will presently appear, the plates 46 are spaced a maximum distance radially outwardly from the centers 30, 32, about which they may swing, despite the fact that a minimum transverse spacing of the lowermost portions of the wheels is maintained.

Extending through the several sleeves 48, 50 are hinge pins 52, the ends of which are engaged in end openings 53 (see Figure 3) of their associated cross members 36 or 40, as the case may be.

Roller bearings 54 or other suitable bearing means (see Figure 3) are interposed between the pins 52 and the walls of the sleeves 48 or 50, again for the purpose of reducing friction to a minimum during the normal operation of the device.

Rigid with and projecting laterally outwardly from the central portions of the plates 46 are wheel-support spindles 56. As will be noted from Figure 2, these have their lengths normal to the planes of the plates 46, and also as readily seen from Figure 2, the inner end portions of the spindles are actually spaced from the standard 24 a distance less than the hinge axes defined by the pins 52. This results from the arrangement of the sleeves 48, 50 against the outer faces of the plates 46, with the spindles 56 also being secured to and extending laterally outwardly from said outer faces.

The spindles 56, in and of themselves, can be of basically conventional construction. As will be noted, they extend into hubs 58 formed on wheels 60 having rims 62 on which are mounted tires 64. Suitable bearings are provided within the hubs, of course. Obviously, the particular construction of the spindles and wheels can be varied without departure from the spirit of the invention.

In use, the wheels will normally be disposed in horizontally, transversely aligned positions, that is, the lowermost portions of the wheels will be in a common horizontal plane. In these circumstances, the lower pins 52 will be disposed in a common horizontal plane, which plane includes the lower bearing pin 32. Similarly, the upper hinge pins 52 and the upper bearing pin 30 will be in a common horizontal plane. The standard 24 will be disposed in a vertical plane, with the wheels being symmetrically disposed at opposite sides of said vertical plane. The pins 30, 32 will be disposed in said vertical plane of the standard.

This will be the arrangement as the tractor moves forwardly over level ground. If, however, an obstruction such as indicated at A in Figures 1 and 2 is met, one wheel will be elevated relative to the other wheel. The result will be that the cross members will move into positions inclined from the horizontal. Therefore, one wheel will be vertically displaced upwardly in respect to the standard while the other wheel will be displaced downwardly in respect to the standard, as clearly shown in Figure 2. The cross members, as previously noted, are of different lengths, and therefore, the lower hinge pins 52 will travel in arcs about the axis defined by the pin 32, while the upper hinge pins 52 will travel in arcs about the upper bearing pin 30. The radius of the circular path partially traversed by the lower hinge pins 52 about the center defined by the lower bearing pin 32 will be shorter than the radius of the circular path traversed in part by the upper hinge pins 52 about the axis defined by the upper bearing pin 30.

The result will be that the wheel elevated (that is, the right-hand wheel viewing the same as in Figure 2) will move into a progressively greater angle of inclination relative to the vertical plane defined by the standard 24. This will mean that the lowermost portion of the elevated wheel will not only move upwardly in a vertical direction, but also, will travel in a direction having a horizontal component, toward the vertical plane defined by the standard 24. In other words, the lowermost portion of the elevated wheel will move closer to the mid-width point of the steerable front wheel assembly. The topmost portion of the elevated wheel will also move in a direction toward the mentioned vertical plane, but will do so over a horizontal distance less than that traversed by the lowermost portion. The distance between the specified vertical plane and said topmost portion is reduced at a rate less than the rate of decrease of the distance between the vertical plane and the lowermost portion. This holds true not only for the raised wheel but also for the lowered one. The greater the vertical displacement of a wheel in respect to the standard, the greater will be the camber, that is, the inclination of said wheel from the vertical, whether the displacement is upward or downward. Therefore, the horizontal distances between the mentioned vertical plane and the lowermost portions of both wheels are reduced when the wheels move out of their normal, horizontally aligned positions.

This has been found to be very desirable. One advantage from the arrangement results by reason of the fact that the transverse distance between the lowermost portions of the wheels is kept at a highly desirable minimum. In fact, said transverse distance tends to decrease as one wheel is elevated relative to the other. At the same time, the topmost portion of the elevated wheel, since it moves in a direction having a horizontal component as well as a vertical component, clears portions of the tractor disposed immediately above the same. The vertical travel of the topmost portion of the wheel, it should be noted, is less than that of the lowermost portion. It follows that given an obstruction A of a certain height, the topmost portion of the wheel riding thereover will move vertically a distance less than that height.

This structural and functional characteristic is obtained in combination or coactive relationship with the arrangement wherein the wheels are spaced apart very closely, due to the fact that the hinge axes 52 are disposed laterally outwardly from the planes of the plates 46. A maximum radius is achieved for the arcs described by the pins 52, relative to a minimum transverse spacing between the wheels.

It has been found in practice that the arrangement has highly desirable results, not achieved by other steerable front wheel assemblies wherein it has been proposed to permit free relative vertical movement of the transversely spaced wheels. Normally, said wheels are spaced apart a rather substantial distance, and the clearance functions, the retention of minimum spacing, and other desirable characteristics of the present invention are not achieved by the devices heretofore conceived.

The invention, further, has the desirable characteristics wherein it can be mounted upon a generally conventional steering assembly of a tractor or equivalent vehicle, without requiring any modification or redesign of said vehicle except, perhaps, to a completely inconsequential extent.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A front wheel assembly for connection to the steering mechanism of a tractor or like implement, comprising: a standard in the form of a pair of spaced, flat plates elongated in a vertical direction, and a bight portion integrally connected to the lower ends of said plates; a connector plate rigid with the upper ends of the plates of the standard for securing the same to the steering mechanism for rotation about an upright axis; upper and lower bearing pins affixed to the first-named plates in the space therebetween; a pair of upper cross members and a pair of lower cross members carried by the upper and lower bearing pins respectively, the several cross members extending transversely of and being connected midway between their ends to the standard by said pins, for rocking movement about the pins between horizontal and tilted positions respectively, about generally horizontal, parallel axes respectively defined by the upper and lower bearing pins and lying in a common vertical plane bisecting said standard; a pair of flat, downwardly convergent wheel-support plates respectively disposed at opposite sides of the standard, each plate extending between and being pivotally connected at its upper and lower ends to corresponding end portions of the upper and lower cross members, the connections of the respective plates to the end portions of the upper cross member being spaced a radial distance from the axis of rocking movement of said upper cross member greater than the radial distance that the connections of the plates to the end portions of the lower cross member are spaced from the axis of rocking movement of the lower cross member; wheel spindles secured to and projecting laterally outwardly from the respective plates, intermediate the ends of the plates, said spindles extending perpendicularly to the planes of the plates; and ground wheels mounted upon the respective spindles, said wheels being downwardly convergent correspondingly to the plates and being rotatable in planes parallel to those of the respective, adjacent plates.

References Cited in the file of this patent

UNITED STATES PATENTS

| 1,930,619 | Johkhoff | Oct. 17, 1933 |
| 2,208,599 | Ronning | July 23, 1940 |
| 2,208,600 | Ronning | July 23, 1940 |
| 2,222,857 | Ronning | Nov. 26, 1940 |

FOREIGN PATENTS

| 356,420 | France | Oct. 3, 1905 |